US005897733A

United States Patent [19]

Stevens

[11] Patent Number: 5,897,733

[45] Date of Patent: Apr. 27, 1999

[54] METHOD AND APPARATUS FOR PRINTING SINGLE SHEET FOLDED DOCUMENTS

[75] Inventor: Scott A. Stevens, Downers Grove, Ill.

[73] Assignee: Wallace Computer Services, Inc., Hillside, Ill.

[21] Appl. No.: 08/808,106

[22] Filed: Feb. 28, 1997

Related U.S. Application Data

[63] Continuation of application No. 08/395,829, Feb. 28, 1995, abandoned.

[51] Int. Cl.$^{6}$ .............................. B32B 31/00; B31B 1/88; B65D 27/00

[52] U.S. Cl. .......................... 156/227; 156/252; 156/277; 156/291; 156/388; 156/442.1; 156/443; 270/1.03; 493/188; 53/460

[58] Field of Search ............................. 156/64, 227, 277, 156/388, 441.5, 442.1, 252, 510, 443, 291; 229/68.1, 300, 302, 307, 313, 314; 270/1.02, 4, 20.1, 1.03; 493/187, 188; 53/460

[56] References Cited

U.S. PATENT DOCUMENTS

| | | | |
|---|---|---|---|
| 3,983,679 | 10/1976 | Zemke . | |
| 4,031,818 | 6/1977 | Kehoe . | |
| 4,343,129 | 8/1982 | Gunther, Jr. et al. | 53/206 |
| 4,668,211 | 5/1987 | Lubotta et al. | 493/188 |
| 4,797,832 | 1/1989 | Axelrod et al. . | |
| 4,912,909 | 4/1990 | Stenner | 53/429 |
| 4,944,450 | 7/1990 | Schmidt | 229/73 |
| 5,048,809 | 9/1991 | Tebbe et al. | 270/45 |
| 5,049,227 | 9/1991 | Long et al. | 156/442.1 X |
| 5,095,682 | 3/1992 | Steidinger | 53/411 |
| 5,114,128 | 5/1992 | Harris, Jr. et al. | 270/11 |
| 5,143,362 | 9/1992 | Doane et al. . | |
| 5,155,973 | 10/1992 | Hipko et al. | 53/452 |
| 5,196,083 | 3/1993 | Baker et al. | 156/364 |
| 5,317,654 | 5/1994 | Perry et al. | 382/61 |
| 5,328,438 | 7/1994 | Crowley | 156/277 X |
| 5,437,441 | 8/1995 | Tuhro et al. . | |
| 5,444,961 | 8/1995 | Doane et al. . | |
| 5,518,574 | 5/1996 | Yates et al. | 156/442.1 X |
| 5,527,418 | 6/1996 | Ginsberg | 156/227 X |
| 5,538,232 | 7/1996 | Long | 270/1.03 |
| 5,547,175 | 8/1996 | Graushar et al. | 270/1.03 X |
| 5,630,899 | 5/1997 | Meschi | 156/227 X |
| 5,680,742 | 10/1997 | Hidding | 53/460 X |
| 5,711,846 | 1/1998 | Alicea . | |
| 5,785,242 | 7/1998 | Lombardo | 229/305 |
| 5,803,889 | 9/1998 | Littman | 493/188 X |

OTHER PUBLICATIONS

Valko, G; Hubscher, B., "Systems for Innovative Mailshots and Intelligent Forms," Polygraph International, No. 2, pp. 2, 32–34, 1992.

*Primary Examiner*—Curtis Mayes
*Attorney, Agent, or Firm*—Roylance,Abrams,Berdo & Goodman, L.L.P.

[57] ABSTRACT

A method and apparatus for producing a folded document, such as a mailer, including a camera and microprocessor for viewing printed information on a printed sheet and storing the information in a memory. The printed sheet is then folded to enclose the printed information within the folded sheet. A printer is connected to the camera and microprocessor to retrieve the stored information and print the information on the folded sheet.

25 Claims, 2 Drawing Sheets

METHOD AND APPARATUS FOR PRINTING SINGLE SHEET FOLDED DOCUMENTS

This application is a continuation application of Ser. No. 08/395,829 filed Feb. 28, 1995, now abandoned.

FIELD OF THE INVENTION

The present invention relates to a method and apparatus for producing a document having printed variable information on two sides of the document. More particularly, the invention is directed to a method and apparatus for capturing an image of variable information printed on one side of a document and reproducing the variable information on the opposite side of the document.

BACKGROUND OF THE INVENTION

Single sheet folded mailers, also known as self-mailers, are commonly used for high volume mailings of short form letters. Self-mailers produced from a single folded sheet often have one or more perforated edges to allow easy opening by the recipient. Self-mailers are typically produced from a single sheet of paper which can be printed on one or both sides and sealed around the edges. These mailers are particularly useful where large numbers of the documents are needed since they can be produced quickly from a continuous roll or supply of cut-sheet paper. Self-mailers provide an economical and efficient manner of sending bills or checks without the expense of stuffing standard envelopes. Mailers, however, are generally limited in that they are formed in a limited number of configurations and sizes which inherently reduce the area available for printing.

One form of self-mailer commonly produced in the large volume mailing industry passes a single sheet of paper through a printer where the desired information is printed on one or both sides of the paper. The address of the recipient is printed on the heading of the printing surface which will become the inside of the mailer. A transparent viewing window is often formed in the printed sheet and positioned to display the printed address when the mailer is folded and sealed. The mailer is formed by passing the printed sheet through a folding machine to overlap the window over the address and seal the mailer closed. One form of folding machine seals the side edges with an adhesive and forms perforations along opposite edges to aid in opening by the recipient. This form of self-mailer has the disadvantages of having limited space available for printing information and requiring a specific location of the information. Specifically, the location of the window limits the amount of space available for printing. In addition, the location of the address on the printed side of the sheet and the location of the window are dictated by the need to display the address of the completed mailer in a manner to ensure proper delivery by the postal service.

It is often desirable to print self-mailers on both sides of the sheet before or after folding. Most commercially available printers are able to print on only one side. Although two-sided printers are available, they are expensive, thereby increasing the capital investment. Generally, when it is necessary to print on both sides of the sheet, the sheet must be turned over and guided back to the one-sided printer where the second side is printed. This arrangement has the distinct disadvantage in cut sheet printers in that printing on both sides reduces the throughput by one half.

Continuous form printers, such as, for example, large mainframe IBM and Siemens printers, are not able to print on both sides of the sheet. With these systems, the only way to print both sides is to provide two printers connected in series so that the first side of the sheet is printed by the first printer, and the second side is printed by the second printer. This arrangement usually requires the sheet to be flipped over after leaving the first printer and before entering the second printer. This type of assembly does not slow the production rate, but doubles the cost of printing equipment.

Another form of mailer sometimes used in the industry prints a sheet on one side only with the address displayed on the upper third of the sheet. The sheet is then folded in a Z-fashion so that the address is exposed with the body of the letter sealed inside. This arrangement, while inexpensive, results in a loss of one-third of the available space for printing the desired information.

Examples of the previous systems for printing self-mailers are disclosed generally in U.S. Pat. Nos. 4,668,211 to Lubotta et al; 5,196,083 to Baker et al; 5,155,973 to Hipko et al; 5,114,128 to Harris, Jr. et al; 5,095,682 to Steidinger; 4,343,129 to Gunther, Jr. et al; and 4,912,909 to Stenner. These systems typically require complex printing devices which are expensive to purchase and operate. Accordingly, there is a continuing need in the industry for a method and apparatus for producing self-mailers which overcome the disadvantages of the previous printing and folding systems.

SUMMARY OF THE INVENTION

The disadvantages and limitations of the previous printing and folding apparatus are obviated by the present invention while providing an efficient method and apparatus for printing variable information on a folded sheet. Accordingly, an object of the invention is to provide a method and apparatus for folding a document and printing information on the exposed outer surface of the folded document.

A further object of the invention is to provide a method and apparatus for viewing and capturing an image of variable information on a printed document before being folded.

Another object of the invention is to provide a method and apparatus for capturing an image of variable information on a first side of a printed sheet and printing the variable information on a second side of the document after folding and sealing the printed sheet.

Still another object of the invention is to provide a method and apparatus for printing an address on a folded mailer without inverting the folded mailer.

A further object of the invention is to provide a method and apparatus for producing a document printed on two sides without inverting the document and without the use of two-sided printers.

Another object of the invention is to provide a method and apparatus for producing a folded mailer which is inexpensive while maintaining a high output rate.

These and other objects of the invention are basically attained by a method of producing a document having information printed on first and second sides, comprising the steps of providing a sheet having variable information printed on the first side thereof; viewing and capturing the variable information on the first side and storing the variable information; folding the sheet whereby the printed information on the first side is enclosed by the sheet and the second side of the sheet is exposed, and retrieving the stored information and printing the information on the second side of the folded sheet.

Other objects of the invention are attained by a method of producing a self-mailer comprising the steps of preparing a blank of sheet material having information printed on a first side thereof, the information including a mailing address, imaging the mailing address and storing the image of the mailing address, advancing the sheet through a folding device and folding the sheet to form a folded sheet so that the printed information and address on the first side are enclosed within the folded sheet and a second side of the sheet is exposed, and advancing the folded sheet to a printing station, retrieving the image of the mailing address and printing the mailing address on the second side of the folded sheet.

Further objects of the invention are attained by an apparatus for folding and printing a folded sheet comprising a folding device for receiving a sheet having printed information on a first side, the folding device having means for folding the sheet to a folded sheet so that the first side is enclosed with the folded sheet, the folding device further including a feed end and a discharge end, a camera device positioned at the feed end of the folding device for viewing and storing an image of the printed information, and a printing device connected to the camera and positioned at the discharge end of the folding device for retrieving the stored information from the camera, and printing the information on a second side of the folded sheet.

Other objects, advantages and salient features of the present invention will become apparent from the following detailed description, which, taken in conjunction with the annexed figures, discloses preferred embodiments of the invention.

BRIEF DESCRIPTION OF THE DRAWINGS

Referring to the figures which form a part of this original disclosure.

DETAILED DESCRIPTION OF THE INVENTION

Figure 1:
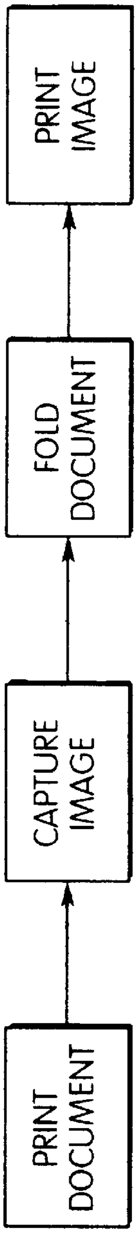
FIG. 1 is a flow chart of the method of the invention in one embodiment of the invention.

Referring to the figures, the method of the invention includes an assembly 10 having a printer 26 for producing a printed sheet 12 which is passed through a second printer assembly 16 and a folding apparatus 28. The second printer assembly 16 includes a camera 14 to capture and store printed information on sheet 12 and a printing device 44. Sheet 12 is folded by the folding apparatus 28, and the stored information in printing assembly 16 is printed by printer 44 on the folded sheet 22.

The method of the invention is particularly directed to printing information on two sides of a single sheet without the use of a two-sided printing apparatus and without inverting the sheet during the printing steps. Sheet 12 can be a pre-printed sheet containing printed information on one or two sides, depending on the particular needs and uses for the finished sheet. Generally, sheet 12 is a sheet having printed variable information 18 on one side only. An advantageous feature of the invention is the ability to accept a printed sheet having variable information 18 on the printed side and print the same variable information on the opposite side of the sheet. The variable information 18 can be an address, account number, or other printed indicia.

Sheet 12 can be essentially any form of printed document. In preferred embodiments, sheet 12 is a document directed to a specific individual such as, for example, a self-mailer, letter or bank statement. Sheet 12 can be a standard form letter where the body of each letter is the same, but each letter includes a personalized name and address. The method and apparatus are particularly suitable for single and multiple sheet mailers having a printed information side where the sheets are folded and secured together to form a closed folded mailer 22. The outer face of the mailer is then printed with the name and address of the intended recipient.

The folded mailer 22 provides a convenient and efficient system for sending bills and checks without the need for a separate envelope. The folded mailer 22 in further embodiments can be used for various business mailings, such as, for example, notices, purchase orders, coupons, and the like.

Sheet 12 is initially printed on at least one side by standard printing equipment 26 such as, for example, computer operated inkjet or laser printer. Printer 26 is preferably upstream and connected in series with folding apparatus 28. In alternative embodiments, the printer 26 is in a remote location from the folding apparatus 28. In this manner, a large volume of printed sheets 12 can be continuously processed, or the printed sheets 12 can be stored after printing and processed further at a later time or different location. In further embodiments, several printers can be used to produce printed sheets which can then be fed to folding apparatus 28.

Figure 2:
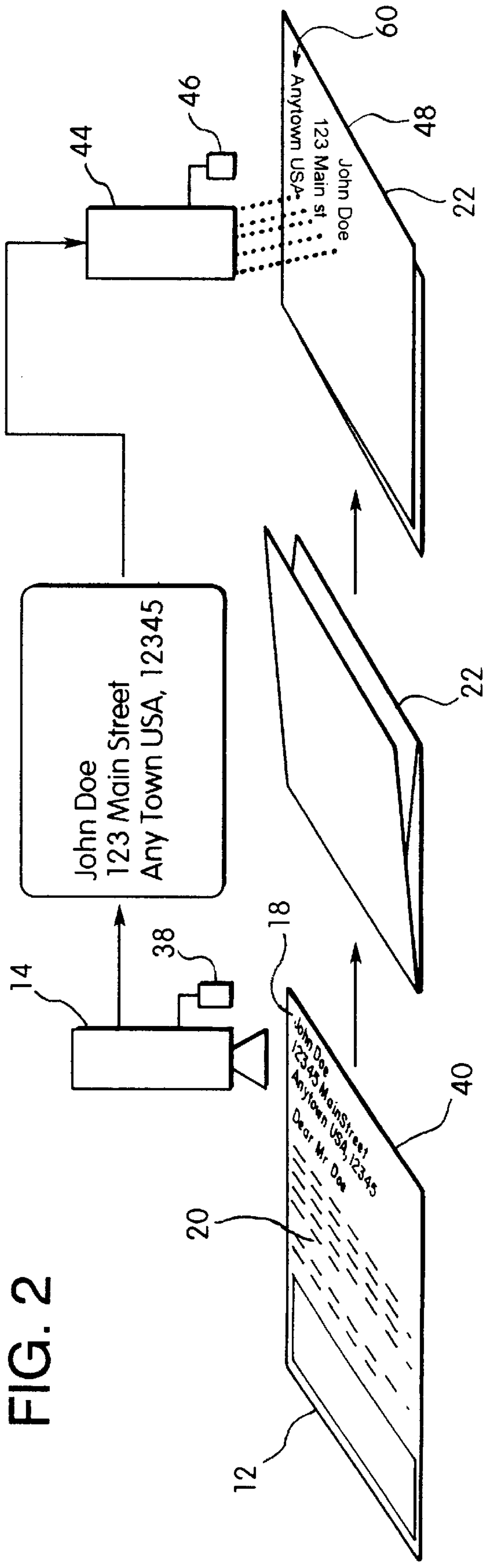
FIG. 2 is a schematic diagram of the apparatus and method of capturing and storing an image of the information on a printed sheet, folding the sheet, and printing the stored information on the folded sheet.

Referring to FIGS. 1 and 2, the method of the invention in one preferred embodiment produces a printed sheet 12 in the form of a printed letter having variable information 18 and body portion 20 of the letter. In this embodiment, variable information 18 is an address. Variable information 18 is preferably printed in the upper portion of printed sheet 12 adjacent one of the side edges. Sheet 12 is continuously advanced past camera 14 positioned at the feed end of the folding apparatus. Camera 14 captures an image of variable information 18 on printed sheet 12. The captured image is stored in a suitable memory as discussed hereinafter in greater detail. After variable information 18 on printed sheet 12 is captured and stored, sheet 12 is advanced to the folding apparatus where sheet 12 is folded and sealed in the final desired configuration as folded sheet 22. Folded sheet 22 is advanced to printer 44 where the captured image of the printed variable information 18 is reproduced on the outer face of folded sheet 22 as printed information 60. One or more optional insert sheets can also be introduced during the folding step to be included with the folded sheet 12.

In preferred embodiments, camera 14 is positioned to capture an image of the address of the intended recipient usually appearing at the top of the printed sheet. In further embodiments, camera 14 can be positioned and operated to view and capture an image of any selected area of the printed sheet.

Figure 3:
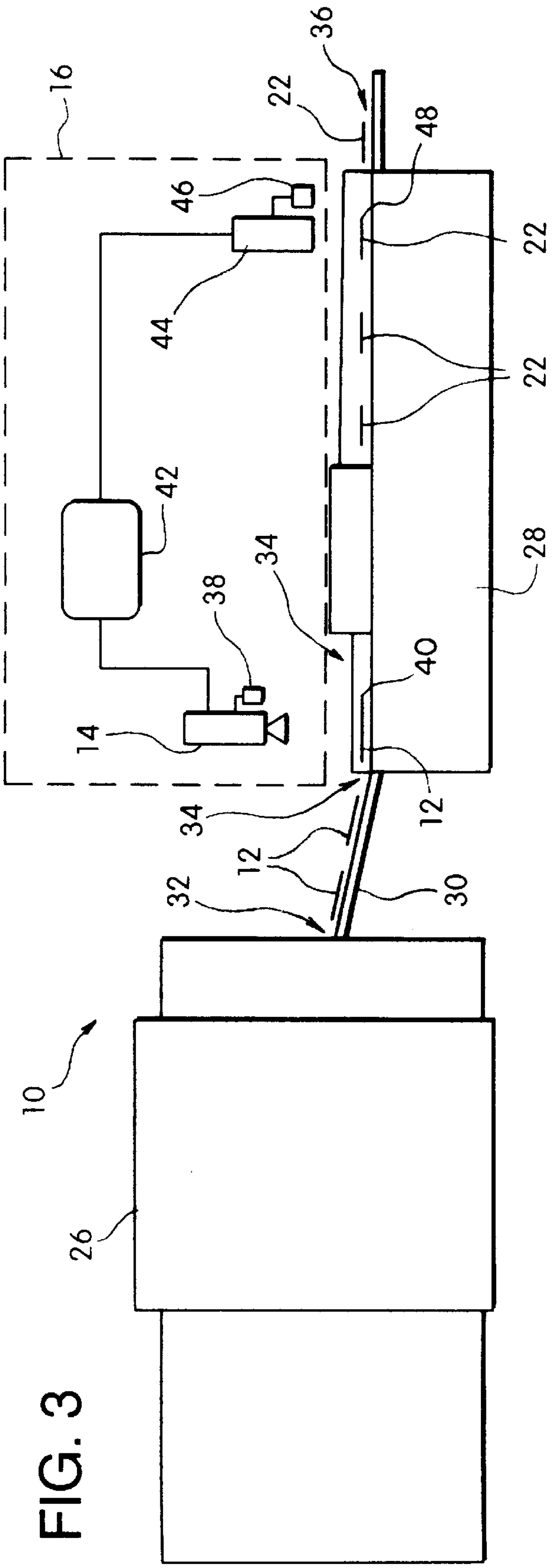
FIG. 3 is a schematic diagram of the apparatus for printing information on a sheet, capturing an image of printed information on the sheet, and for folding the printed sheet.

Referring to FIG. 3, the assembly 10 includes the first printer 26 coupled in series to folding apparatus 28. Printer 26 can be a conventional continuous form printer connected to an operating computer. Examples of suitable printers are made by Xerox Corporation, IBM and Siemens Co. Generally, printer 26 prints only on one side of sheet 12. In embodiments of the invention, printer 26 is a computer controlled laser or inkjet printer such as the commercially available printers marketed by Hewlett Packard Corporation. Other printers, such as an impact printer, can be used in the invention.

In the embodiment shown in FIG. 3, printer 26 is coupled to folding apparatus 28 by a suitable conveyor 30 or continuous sheet feeding and advancing system as known in the art. Conveyor 30 can take the form of any suitable sheet handling apparatus for advancing printed sheets 12 from the outfeed 32 of printer 26. Printer 26 can also be located in a remote location where a large volume of sheets are printed and stored until ready for completion. In this embodiment, folding apparatus will include a suitable feed apparatus to handle the printed sheets.

Printer 26 in preferred embodiments is a computer controlled laser printer capable of high speed quality printing of original documents on one side of a blank sheet. In alternative embodiments, a two-sided printer can be used. The information to be printed on the blank sheet, such as a form letter, can be stored digitally in a computer and retrieved automatically as needed to be printed on the sheet to produce printed sheet 12. The preferred computers and printers are able to merge variable information with the digitally stored information. As an example of a preferred apparatus, the computer and printer can merge an address with a form letter. The printed sheets 12 are printed in a single pass through printer 26 with the variable information 18 printed in the selected location. The printed variable information 18 is preferably contained within suitable margins so as not to interfere with the folding and sealing of printed sheet 12.

Printed sheet 12 can be any suitable dimension depending on the document being produced. Generally, the blank sheet will be no wider than about 8½ inches and have a length of about 11–14 inches. The dimensions of blank sheet 32 will be determined to a large extent by the capabilities of the printers and folding apparatus employed.

Folding apparatus 28 in preferred embodiments is a commercially available apparatus for folding and sealing printed sheets 12. In preferred embodiments, folding apparatus 28 folds printed sheets 12 in a manner suitable for mailing without the need for a separate envelope. Folding apparatus 28 is able to fold the printed sheets into a number of different folded positions depending on the intended final use. Preferably, folding apparatus 28 folds the printed sheet into thirds with the end portions folded onto each other. The folded sheet is typically sealed with a suitable adhesive along two sides or three sides, depending on the type of fold. Perforations are preferably applied by folding apparatus 28 adjacent the adhesive seal to permit easy opening of folded sheet 22.

Referring to FIG. 3, folding apparatus 28 includes a feed end 34 or input for receiving printed sheets 12 from printer 26. Printed sheets 12 are then advanced through folding apparatus 28 to the output end 36 and exit as folded sheets 22. The folded sheets 22 are then advanced to a further processing station, such as a postage meter in the case of a mailer, or a packaging apparatus.

At feed end 34 of folding apparatus 28 an optical sensor 38 is positioned above the feed pathway to detect the position of printed sheet 12 relative to camera 14 and to the feed end 34 of folding apparatus 28. In preferred embodiments, optical sensor 38 detects the leading edge 40 of printed sheet 12 as it is advancing past camera 14 and actuates camera 14 to capture the image of the printed information on printed sheet 12. Camera 14 is coordinated with sensor 38 to focus on a predetermined area of printed sheet 12 to capture only the selected areas of the printed information. Actuation of camera 14 is based on a preprogrammed timing sequence from the time the leading edge 40 is detected by optical sensor 38 since the printed information on sheet 12 to be captured will be in a preselected location. The timing sequence is controlled by computer controller 42 and can be programmed by the operator to accommodate the printed sheet being processed. The timing sequence will depend on the location of camera 14 with respect to optical sensor 38 and the location of the printed information being captured and the speed at which the sheet travels past camera 14. Printed sheet 12 can be continuously advanced past camera 14. Alternatively, the advancement of printed sheet 12 can be stopped for a period of time under camera 14 while the printed information is being scanned and the image captured. In further embodiments, other types of sensors can be used which are capable of sensing the edge or position of the printed sheet 12 and activating camera 14.

Camera 14 in preferred embodiments is positioned vertically above printed sheet 12 as it advances through the feed end 34 of folding apparatus 28. Camera 14 is typically positioned to scan a pre-selected portion of the information on printed sheet 12. The pre-selected portion of printed sheet 12 which is scanned by camera 14 preferably contains only the variable information 18 which is to be printed on the folded sheet 22 after printed sheet 12 exits folding apparatus 28. Accordingly, printed sheet 12 is initially printed with the variable information 18 intended to be captured in a specific location so as to be scanned and captured by camera 14. In embodiments, camera 14 can be mounted by a movable support to adjust the position of camera 14 in relation to printed sheet 12 and scan different selected areas as needed. In preferred embodiments, camera 14 captures and stores an image of the address when printed sheet 12 is a printed mailer or letter and variable information 18 is an address. In this embodiment, camera 14 is positioned to capture an image of the address without an image of the body of the letter.

Camera 14 can be any form of suitable camera capable of viewing and capturing an image of the selected portion of printed sheet 12. One example of a preferred camera is a black and white charge-coupled image sensor or CCD (charge-coupled device) camera such as the NEC 324A with type 05 modifications to image a selected frame when actuated and a Raptor BitFlow image capture board. Charge-coupled image sensors, also known as solid-state image sensors, comprise a multitude of sensor elements arranged in a grid-like manner on a planar surface. Each element develops a charge corresponding to the amount of light impinging that element when an image is focused on the surface. The CCD camera is particularly advantageous for use with the present invention because the charges from the elements corresponding to the image points positioned relative to the variable text in the image can be stored as binary values in digital memory. These binary values can then be retrieved sequentially to produce an output signal similar to, for example, a raster scan image or television signal. In further embodiments, camera 14 can be a line scan camera as known in the art. Camera 14 is typically capable of scanning a two by three inch area.

Camera 14 is either coupled to or incorporated with a computer controller or microprocessor 42 which digitally stores the captured image until printed. Computer controller 42 receives the image signals from camera 14 and scales the image to a resolution compatible with printer 44 and stores the image until needed. The image is stored in a RAM which in preferred embodiments is capable of digitally storing at least eight images at a time. Computer controller 42 must have sufficient storage capacity as required by the folding apparatus since the conventional folding apparatus can process from two to seven sheets simultaneously. In this manner, the computer controller is able to activate printer 48 and print the correct captured image of the variable information 18 on the corresponding folded sheet 22.

Computer controller 42 is coupled to the second printer 44 to print the captured image on the folded sheet 22. Printer 42 can be any suitable computer operated printer. In embodiments of the invention, printer 44 is an inkjet type printer having a proprietary interface with the computer controller 42 to send raster image data directly to printer 44. An example of a suitable inkjet printer is a Scitex Ektajet. In further embodiments, printer 44 can be a laser printer or impact printer as known in the art.

Computer controller 42 can be a microprocessor, for example, an 80486 Intel PC processor. This system is capable of tracking the printed sheets 12 being folded in folding apparatus 28 to coordinate the appropriate folded sheet 22 with the correct captured image. The actuation of printer by computer controller 42 is typically by a pre-programmed timing sequence based on the folding apparatus used since each folding apparatus operates at a constant speed and output rate. The timing of the printer will depend on the advancing speed of folded sheet 22 and the desired location of the printed information. Computer controller 42 scales the captured image to a proper resolution for the folded sheet and printer 44. For example, when printer 44 is a Scitex Ektajet printer, the image is scaled to 240 dpix 120 dpi.

A second optical sensor 46 is connected to printer 44 to detect the position of the folded sheet 22 exiting the outfeed 36 of folding apparatus 28. In preferred embodiments, optical sensor 46 detects the leading edge 48 of folded sheet 22 and produces an appropriate signal to actuate printer 44, whereby the captured image is printed on folded sheet 22 as a printed image 60 in the selected location on folded sheet 22. Printer 44 is generally actuated by a timing sequence based on the detection of the leading edge to print the captured image in the selected location. The timing sequence for printing is determined by computer controller 42 and can be pre-programmed by the operator. The timing sequence is dependent on the location of printer 44 with respect to optical sensor 46 and the desired print location on folded sheet 22.

Folding apparatus 28 is a commercially available folding apparatus capable of processing a large volume of printed sheets and being capable of cooperating with printer 44 and camera 14. Folding apparatus 28 is preferably interfaced on-line with first printer 26 and receives printed sheets 12 directly from printer 26. Alternatively, folding apparatus 28 operates off-line. It is desirable to operate folding apparatus 28 off-line from printer 26 when high output is required, since the apparatus 28 is able to process the output from as many as three laser printers. In practice, the throughput rate of folding apparatus 28 is controlled by the capacity of camera 14 and printer 44.

The folding apparatus 28 which is employed is selected according to the desired end use of the folded sheet. A suitable folding apparatus is the 2320 Multisealer produced by GBR Systems Corporations. This folding apparatus is particularly desirable where the end product is a mailer. The printed sheets can be passed through the folding apparatus at a fast rate and folded into a single, C- or Z-fold. The apparatus is also able to seal and perforate the sheet along two or three edges to permit easy opening of the folded sheet.

Figure 4:
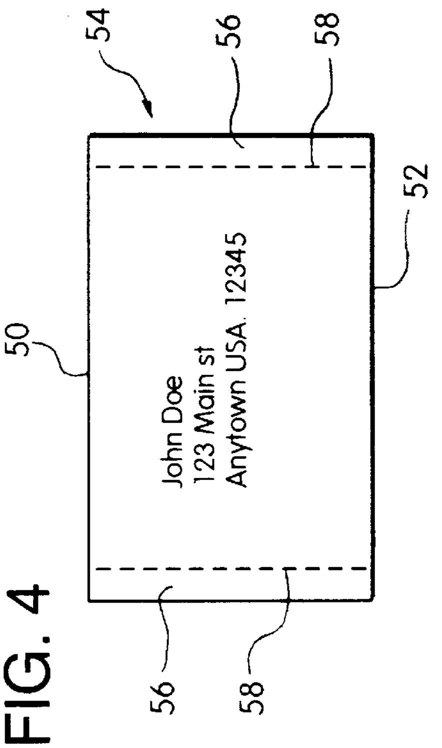
FIG. 4 is a top view of a folded sheet in one embodiment of the invention.

The folding apparatus receives the advancing printed sheets and folds the sheets in the desired configuration while applying an adhesive along the side edges. In embodiments of the invention as shown in FIG. 4, printed sheet 12 is folded in thirds along fold lines 50, 52 so that the resulting folded sheet 54 is essentially one-third the original length. An adhesive is applied between the overlapping portions of the fold sheet along marginal side edges 56. Perforated lines 58 are then formed adjacent the adhesive to provide a means for opening the folded sheet.

Figure 5:
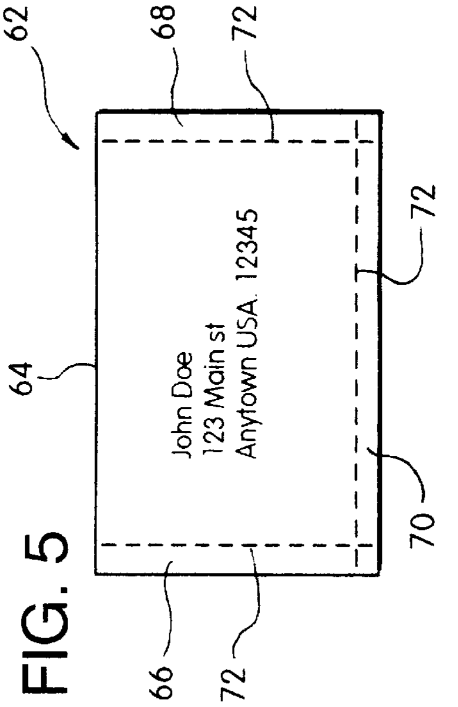
FIG. 5 is a top view of a folded sheet in an alternative embodiment of the invention.

In an alternative embodiment, printed sheet 62 can be folded along a single fold line 64 as illustrated in FIG. 5. In this embodiment, folded sheet 62 is sealed together along marginal side edges 66, 68 and the bottom edge 70. Perforations 72 are also formed adjacent the adhesive and along the bottom edge to define tear strips for opening the folded sheet.

Generally, the folding apparatus forms the perforations parallel to the advancing direction of the sheets so that the perforations are first formed along the side edges. The folded sheet is then rotated 90° and the perforation formed along the bottom edge. The embodiments shown in FIGS. 4 and 5 are particularly desirable for self-mailers.

In the illustrated embodiments, the printed sheet is disclosed as a letter which is folded to form a self-mailer where the captured image is the address to be printed on the folded sheet. It will be readily understood by those skilled in the art that various changes and modifications can be made without departing from the spirit and scope of the invention defined in the following claims.

What is claimed is:

1. A method of producing a document having printed information on first and second sides, comprising the steps of providing a sheet having printed information on said first side thereof, capturing image data of said printed information on said first side and storing said image data as binary values, folding said sheet whereby said printed information is enclosed by said sheet and said second side of said sheet is exposed, and retrieving said stored binary values of said image data and sending raster image data directly to a printer and printing said information on said second side of said folded sheet.

2. The method of claim 1, further comprising printing said information on said first side prior to capturing said information.

3. The method of claim 1, wherein said document is a mailer and said printed information comprises a mailing address.

4. The method of claim 1, wherein said capturing step comprises providing a digital camera and capturing said image data of said printed information on said sheet and storing said image data of said printed information in a microprocessor.

5. The method of claim 1, wherein said folding step comprises folding said sheet along at least one fold line defining two portions so that said portions are superimposed, and securing said portions together.

6. The method of claim 5, further comprising adhesively sealing said folded portions together along opposite side edges and along a transverse edge extending between said side edges.

7. The method of claim 6, further comprising forming perforated lines adjacent said opposite side edges and transverse edge.

8. The method of claim 1, wherein said capturing step comprises detecting an edge of said sheet and capturing a selected portion of said printed information in response to said detected edge, and storing said selected portion.

9. A method of producing a mailer, comprising the steps of preparing a sheet material having printed information on a first side thereof, said printed information including a mailing address positioned in a first location on said sheet, capturing image data of said mailing address in said first location, and storing said image data of said mailing address as binary values in a digital memory of a microprocessor, advancing said sheet through a folding device and folding said sheet to enclose said printed information and address within said folded sheet, and to expose a second side of said sheet, and advancing said folded sheet to a printing device, retrieving said stored binary values of said image data of said mailing address and sending raster image data directly from said microprocessor to said printing device and printing said mailing address on said second side of said folded sheet.

10. The method of claim 9, further comprising folding said printed sheet along at least one transverse fold line defining portions of said sheet so that said portions are superimposed.

11. The method of claim 9, further comprising folding said printed sheet along at least two parallel fold lines, whereby said first side is enclosed within said folded sheet.

12. The method of claim 11, further comprising adhesively sealing said folded sheet along opposite side edges.

13. The method of claim 12, further comprising forming perforated tear lines on said folded sheet parallel said opposite side edges.

14. The method of claim 9, further comprising:

actuating a timing sequence in said microprocessor corresponding to an advancing speed of said folded sheet through said folding device to said printing device, and actuating said printing device by said timing sequence to print said captured image data on said folded sheet.

15. The method of claim 9, further comprising:

providing an optical sensor and detecting a leading edge of said folded sheet, and actuating a timing sequence for said printing device based on detection of said leading edge and printing said raster image data of said mailing address.

16. An apparatus for folding and printing a folded sheet comprising:

a folding device for receiving a sheet having printed information on a first side, said folding device having means for folding said sheet so that said first side is enclosed with the folded sheet, said folding device further including a feed end and a discharge end;

a camera device positioned at said feed end of said folding device and capturing image data of said printed information on said sheet and storing said image data as binary values in a digital memory; and a printing device connected to said camera and positioned at said discharge end of said folding device and receiving raster image data directly from said digital memory, and printing said information on a second side of said folded sheet.

17. The apparatus of claim 16, further comprising an optical sensor connected to said camera and detecting a leading edge of said sheet and actuating said camera.

18. The apparatus of claim 16, further comprising a computer coupled to said camera and storing said image data of said information.

19. The apparatus of claim 16, further comprising an optical sensor at said discharge end and detecting a leading edge of said folded sheet, said optical sensor being connected to said printer to actuate a timing sequence based on an advancing speed of said folded sheet and actuating said printer and printing said information on said folded sheet.

20. The apparatus of claim 16, wherein said folding device includes means for folding said sheet into a mailer and said printed information comprises a mailing address, and wherein said camera captures and stores said image data of said mailing address.

21. The apparatus of claim 20, wherein said printing device prints said mailing address on said folded sheet.

22. The apparatus of claim 16, said folding device comprising sealing means for sealing opposite side edges of said folded sheet.

23. The apparatus of claim 22, said folding device further comprising perforating means for forming perforated tear lines parallel said opposite side edges on said folded sheet.

24. The apparatus of claim 16, said camera device comprising a charged-coupled image sensor for producing a digital output raster image data of said printed information.

25. The apparatus of claim 24, said camera device further comprising a charge-coupled memory computer.

* * * * *